Aug. 18, 1931.  E. DAVIS  1,819,641
CONTROL FOR FLUID MOTORS
Original Filed Sept. 4, 1924  3 Sheets-Sheet 1

INVENTOR.
Ernest Davis
BY Parsons & Bodell
ATTORNEYS.

Aug. 18, 1931.  E. DAVIS  1,819,641
CONTROL FOR FLUID MOTORS
Original Filed Sept. 4, 1924  3 Sheets-Sheet 3

INVENTOR
*ERNEST DAVIS*
BY
*Bohleber + Ledbetter*
ATTORNEYS

Patented Aug. 18, 1931

1,819,641

UNITED STATES PATENT OFFICE

ERNEST DAVIS, OF SYRACUSE, NEW YORK, ASSIGNOR, BY MESNE ASSIGNMENTS, TO THE PROSPERITY COMPANY, INC., OF SYRACUSE, NEW YORK, A CORPORATION OF NEW YORK

CONTROL FOR FLUID MOTORS

Application filed September 4, 1924, Serial No. 735,884. Renewed January 11, 1929.

This invention relates to presses, such as garment or ironing presses, and to a control means therefor which enables one press attendant to rapidly operate two or more ironing presses. This control means is sometimes referred to by the trade as a remote or tandem control.

The invention has for its object an interlocking or interconnected control for a plurality of fluid motors to operate presses and the like, whereby the motors are connected in tandem or in series, so that when one motor is operated on its power stroke, the next or the other motor is operated on its return or reverse stroke, and the machines, such as garment or ironing presses, which are actuated by such motors, operate alternately to each other, which provides a remote control particularly simple in its construction and in the arrangement of its component parts and highly efficient and durable in use.

The invention consists in the novel features and in the combinations and constructions hereinafter set forth, claimed and described.

In describing this invention, reference is had to the accompanying drawings in which like characters designate corresponding parts in all the views.

Figure 1:
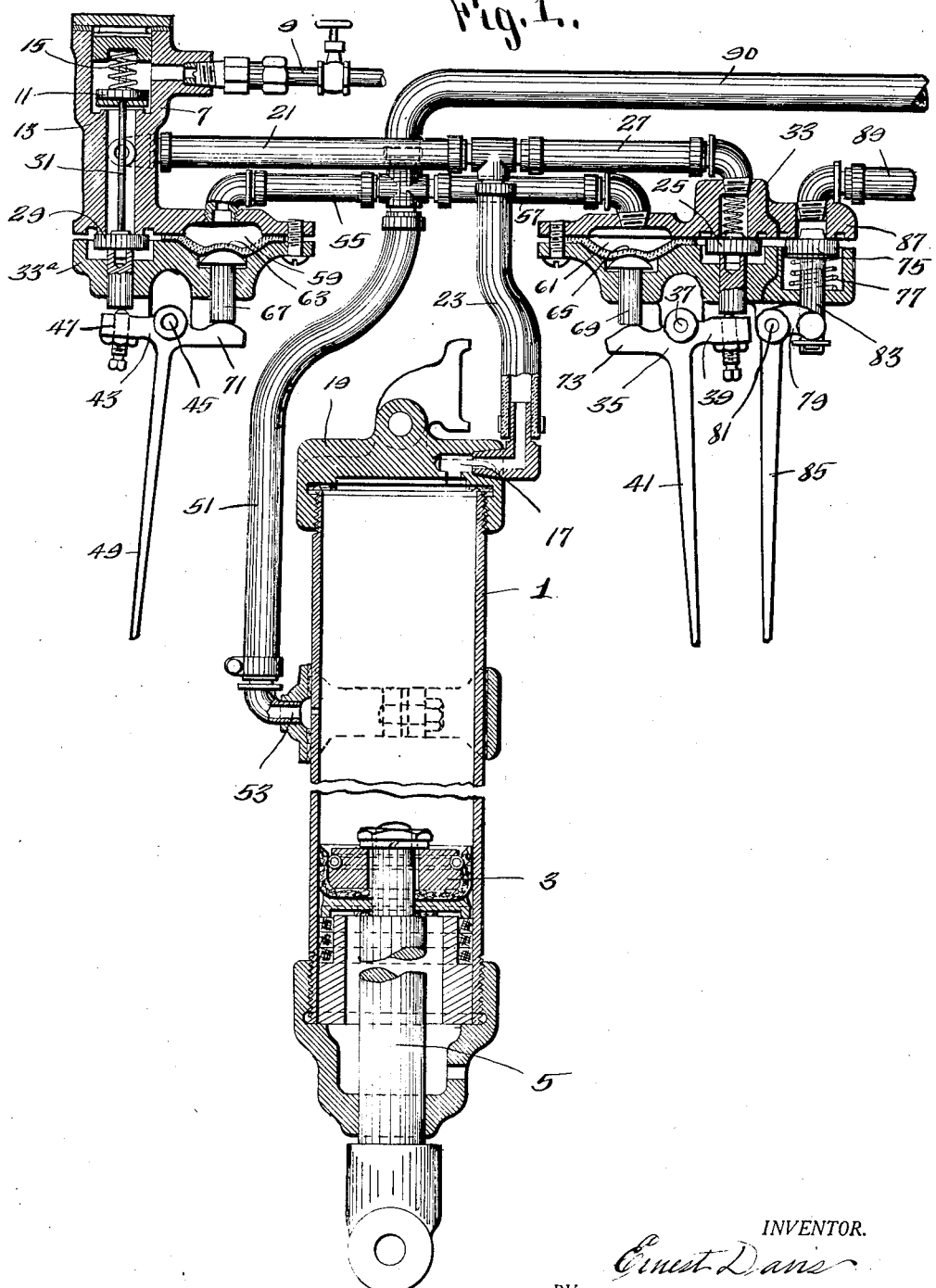
Figures 1 and 2 are vertical sectional views of a pair of fluid motors provided with this interlocking control means, one motor being shown in Figure 1 and the other motor which is paired therewith being shown in Figure 2.
Figure 2:
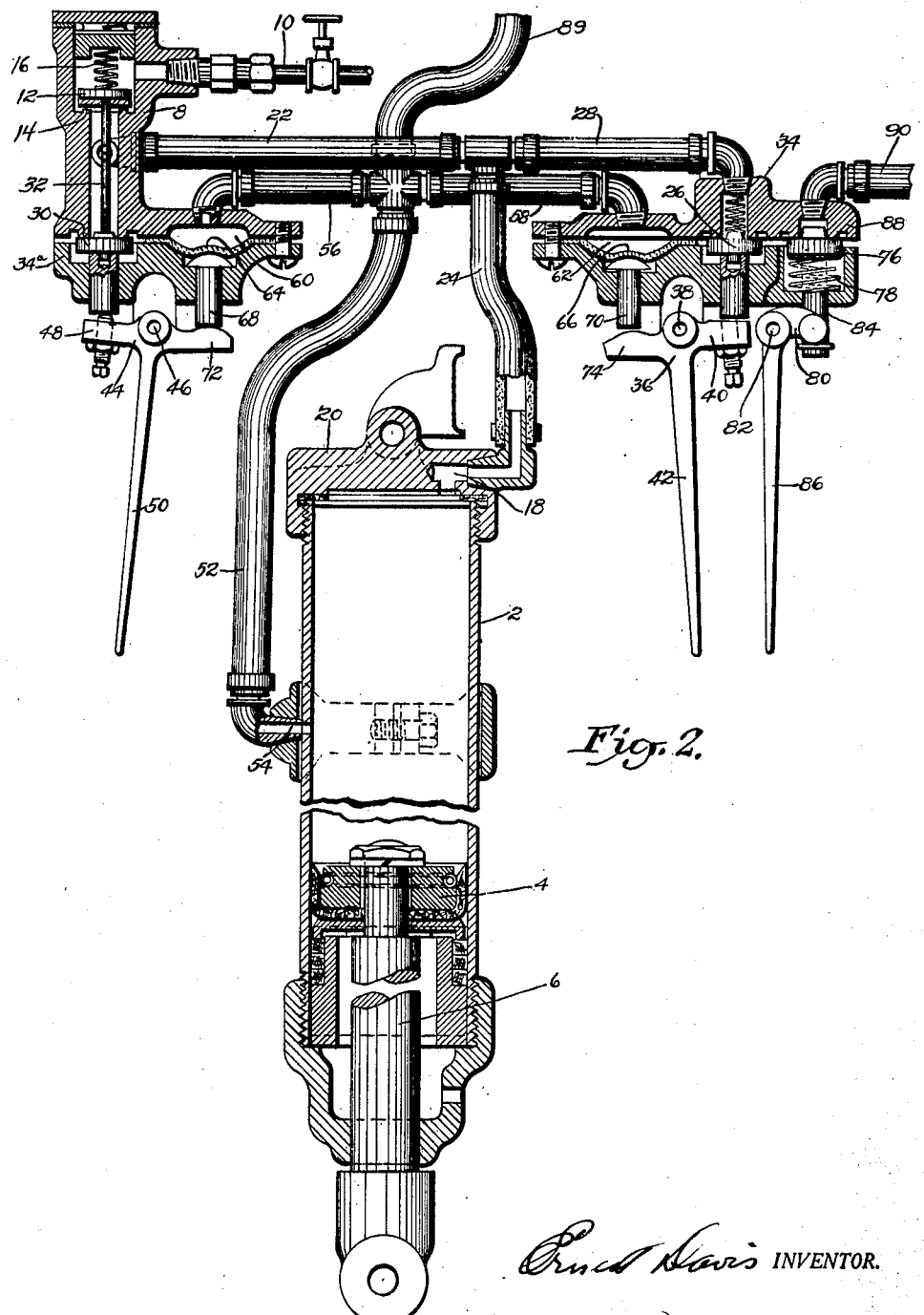

These motors are particularly designed to be used in connection with pressing machines as garment and laundry pressing machines and the interlocking control between the motors is arranged so that when one motor is being operated to close its press, the other motor is being operated to open its press.

One operator attends both machines, and after arranging the work on the machine that is open, he operates the control mechanism to effect the closing of such machine and at the same time operates the remote-control mechanism controlling the opening of the other or remote machine to open it.

The motors and the controlling means here shown are of the same nature as that described in my Patent No. 1,609,273.

This invention in its preferred form comprises a pair of fluid motors, an intake pipe or conduit for each motor, a normally closed intake valve in each conduit, an exhaust valve for each motor, manual means for controlling the opening of the intake valve and the closing of the exhaust valve, means operated by the pressure in the fluid motors for holding the exhaust valves closed, an additional exhaust valve for each motor said valve being normally closed and located in the conduit of said holding means for such motor and being manually operated, and the manual means for the additional exhaust valve of either motor being located near or grouped with the manual control means for the other motor, so that they can be operated at the same time or by the same hand, whereby when one motor is being actuated to close its press, the other motor is operated to open its press.

The fluid motors are here shown as cylinders 1 and 2 and pistons 3 and 4 movable in the cylinders and connected by rods 5 and 6 to any suitable motion transmitting mechanisms, such as toggle means, which are connected to the movable elements or heads of the pressing machines.

7 and 8 are intake conduits or valve casings for the fluid motors 1 and 2 respectively to which are connected pipes 9 and 10, which are connected to a suitable source of supply for an actuating fluid such as compressed air.

11 and 12 are the intake valves located in the casings 7 and 8 respectively, these valves being arranged to be pressed toward their seats 13 and 14 by the air pressure and also by springs 15 and 16. Each valve casing 7 or 8 is connected to a combined intake and exhaust port 17 or 18 in the head 19 or 20 of the cylinder 1 or 2 through pipes 21, 23 or 22 and 24, also this casing 7 or 8 is connected to manually operable exhaust valves 25 or 26 through the pipe 27 or 28.

In this embodiment of my invention, each intake valve casing 7 or 8 is connected in multiple with two manually operable exhaust valves, the valve 25 or 26 being one of such exhaust valves and the valve 29 or 30 being the other, the valve 29 or 30 being located at the lower end of the casing 7 or 8 and coacting with a suitable exhaust port seat leading to atmosphere and being connected by a stem 31 or 32 to the intake valve 11 or 12.

The pipe 21 or 22 communicates with the portion of the casing 7 or 8 between the valves 11 and 29 or 12 and 30. Thus the intake valve casing 7 is connected in multiple with the exhaust valves through the pipes 21, 22 or 27, 28 and the cylinder 1 or 2 is connected in multiple with these exhaust valves through the pipes 23 or 24, 21 or 22, 27 or 28 and casing 7 or 8.

The exhaust valves 25, 26 and 29, 30 are located in suitable casings 33, 34, 33ª, and 34ª. The valves 25 and 26 are adapted to be closed by manual means, each consisting of a lever 35 or 36 pivoted at 37 or 38 and having one arm 39 or 40 thereof coacting with the stem of the exhaust valve 25 or 26 and having a handle 41 or 42, and the exhaust valves 29 and 30 are adapted to be closed by a similar lever 43 or 44 pivoted at 45 or 46 and having an arm 47 or 48 coacting with the stem of the exhaust valve 29 or 30 and as the exhaust valve 29 or 30 is connected by a stem 31 or 32 to the intake valve 11 or 12, the movement of the lever 43 or 44 by an operator to close the exhaust valve 29 or 30, also opens the intake valve 11 or 12. The levers 43 and 44 are also provided with handles 49 and 50.

The means for holding the exhaust valves 25, 26 and 29, 30 in their closed position, which means is operated by the pressure within the cylinder 1 or 2 when the piston is at the end of its power stroke, comprises a supplemental exhaust pipe 51 or 52 connected to a port 53 or 54 opening into the cylinder 1 or 2 in position to be uncovered by the piston 3 or 4 as the piston approaches the end of its out stroke. This pipe 51 or 52 is connected in multiple by pipes 55, 57 or 56, 58 to diaphragm chambers 59 and 61 or 60 and 62 having diaphragms 63, 65 or 64, 66 therein, which act to push outwardly the stems 67, 69 or 68 and 70, which stems coact with arms 71 and 73 or 72 and 74 on the levers 43 and 35 or 44 and 36. Each stem 67, 69, 68 or 70 has a suitable head against which the respective diaphragm thrusts. Thus after the piston has been operated, the pressure is transferred to the diaphragm chambers and acting through the stems 67, 69 or 68, 70 serves to hold the exhaust valves 25 and 29 or 26 and 30 closed and the intake valve 11 or 12 open. When however, either one of the lever handles 49 or 41, or 50 or 42 is moved to open one of the exhaust valves when the piston has uncovered the port 53 or 54, the pressure is relieved in these diaphragm chambers permitting the other exhaust valve to open and the intake valve to close.

The construction thus far described, forms no part of my invention, but forms the subject matter of my patent above referred to and which is shown as an example or one form of well known fluid pressure motor means with or on which my present invention may be used.

This invention relates to an interlocking or intercontrol connection between the two motor means of two independent ironing presses, for example between the exhaust valve mechanism of one machine and the exhaust valve mechanism of the other machine, so that the closing of the exhaust valve of one machine opens the exhaust valve of the other machine.

This interlock as here shown comprises additional exhaust valves 75 or 76, the exhaust valve 75 being carried on the same press with the valve mechanism of the cylinder 1 but actually connected in operating relation to the cylinder 2 of the next machine, that is, the exhaust valve 75 is connected to the cylinder 2 and the exhaust valve 76 to the cylinder 1. Each exhaust valve is normally held closed by a spring 77 or 78 and is operated to open it by levers 79 or 80 pivoted at 81 or 82 and having an arm coacting with the stem 83 or 84 of the valve 75 or 76 to pull down on the same against the spring 77 or 78 and having its other arm 85 or 86 serving as a handle and arranged in juxtaposition to the handle 41 and 42, that is, the handles 41 and 85 of one pressing machine are grouped together so that they can be operated at the same time by one hand and also the levers 42 and 86 of the other pressing machine are grouped together.

The casing 87 for the exhaust valve 75 is carried on or with the casing for the exhaust valve 25 and the casing 88 of the exhaust valve 76 is carried on or with the casing for the exhaust valve 26.

The valve casing 87 for the exhaust valve 75 is connected by a pipe 89 to the supplemental exhaust pipe 52, 56, 58 of cylinder 2 and the casing 88 of the exhaust valve 76 associated with cylinder 2 is connected by a pipe 90 to exhaust pipes 51, 55 and 57 of cylinder 1.

Operation of each cylinder and piston is the same as in my patent referred to, that is to cause the piston to start and continue on its out stroke, both handles 49 and 41 or 50 and 42 must be operated to close the exhaust valves 29 and 25 or 30 and 26 and open the intake valve 11 or 12 and after the piston has completed its out stroke, the pressure from within the cylinder acting through the pipes 51, 55 and 57, diaphragm chambers 59 and 61 and stems 67 and 69 on the arms 71 and 73 hold these exhaust valves closed and the intake valve 11 open, or the pressure acting through the pipes 52, 56, 58 and diaphragm chambers 60 and 62, stems 68 and 70 and levers 44 and 36 hold the exhaust valves 30 and 26 closed and the intake valve 12 open.

Assuming that the pressing machines to which these cylinders 1, 2 are applied work alternately, that is one machine is open while the other is closed, upon the operation of the lever handles 49 and 41 to permit the air to enter the cylinder 1 and force the piston 3 on its out stroke, the lever handle 85 can also be operated at one press to open additional exhaust valve 75 thereon which permits the pressure to exhaust from the cylinder 2 of the other press through pipes 52 and 89 and thus relieve the pressure within the diaphragm chambers 60 and 62 so that the spring acting on the exhaust valve 26 will open the exhaust valve 26 and the spring 16 will close the intake valve 12 and also open the exhaust valve 30 permitting the machine to which cylinder 2 is attached, to be opened by the operator who was standing at the other press on which cylinder 1 is connected.

Likewise, assuming the machine to which cylinder 2 is attached is operated to close it by operating the lever handles 50 and 42, the lever handle 86 can also be operated simultaneously to open additional exhaust valve 76 permitting the pressure to exhaust through the pipes 90 and 51 from the cylinder 1 on the other machine and thus relieves the pressure in the diaphragm chambers 59 and 61 and permit the exhaust valves 25 and 29 to open and the intake valve 11 to close.

It will be understood that when the air is being exhausted from either cylinder, the piston moving in such cylinder moves upwardly under the action of counter-balancing weights or springs attached to the mechanism actuated by the piston. In pressing machines, the return of the piston in the cylinder is effected by the usual counterweight and countersprings acting on the press-head lever which carries the press head.

Figure 3:
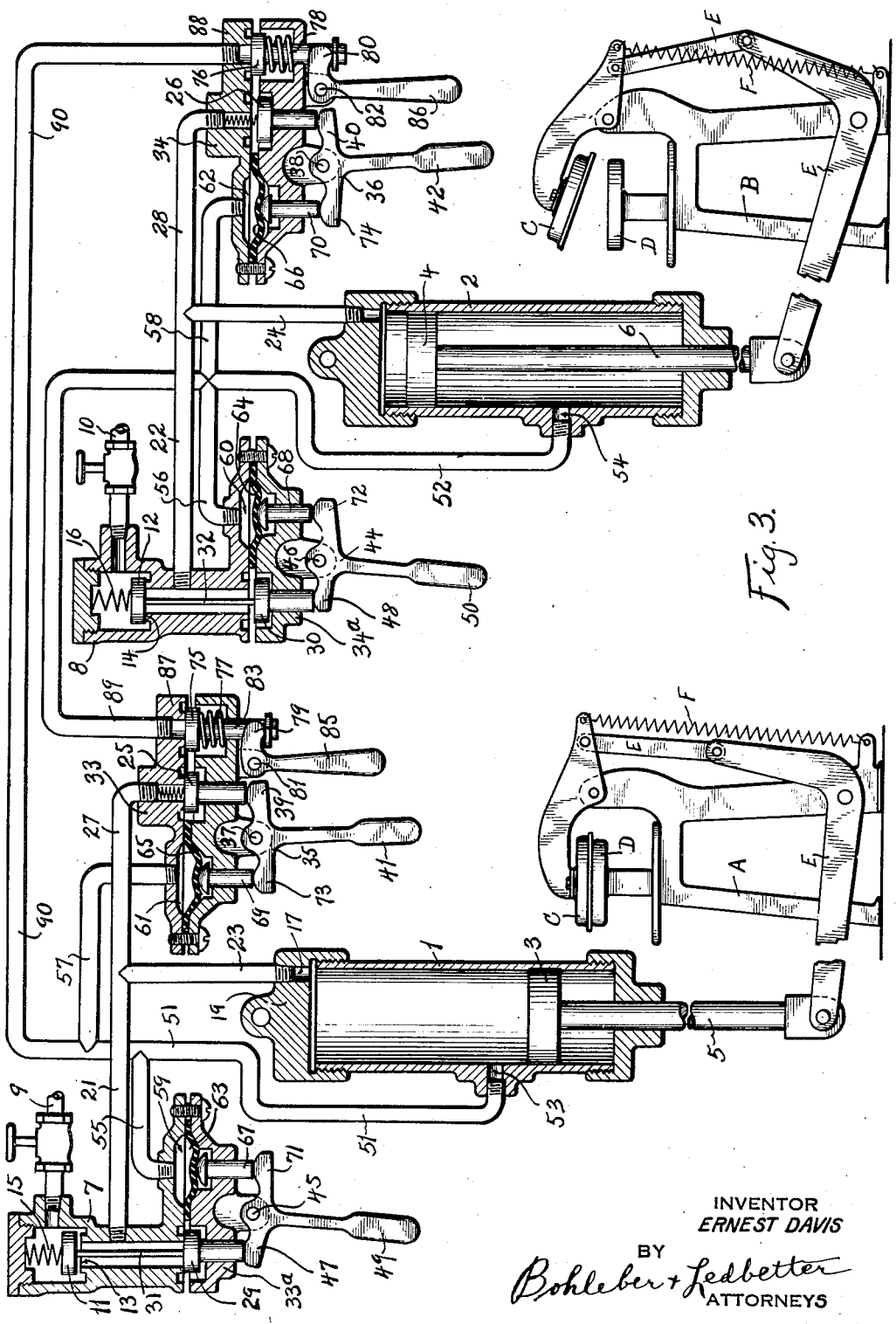
Figure 3 is a diagram of two presses with their motor means and manual controls shown in large sectional views and separated from the machines on the drawing to show the plan of the invention.

Figure 3 is a diagrammatic hook up of two independently operating ironing presses. Two small side views of presses A and B are shown at the lower portion of the drawing and the upper portion of the drawing shows the motor means with the two-hand control for each motor and the remote control for each remote or distantly located press. For example, the cylinder 1 is mounted on press A, and cylinder 2 is mounted on press B.

A typical ironing press, with which my invention may be used, comprises a machine frame A or B, each of which has coacting press jaws such as a press head C adapted to be closed against the work on a buck D thru the action of suitable leverages such as toggle means E to which a motor means 1 or 2 is operatively connected by or thru a connecting rod 5 or 6. Suitable jaw counterbalance means such as a spring F is ordinarily used to open the press head C.

In the use of two presses by one operator, it is noted in Figure 3 that he has spread the work to be ironed on the buck of machine A and closed it by the two-hand control 49, 41. Press A now remains closed under air pressure because the cylinder 1 is open to the air feed line 9 and remains so despite the fact the operator has now released the two handles 49 and 41. As the operator gripped the handles 41 of the two-hand control means 49, 41 with one of his hands (on press A to close that press), he or she also grasped with the same hand the remote control lever 85. By squeezing the two handles 41, 85 together with one hand and pushing lever 49 to the left with the other hand, it follows that press A was closed and press B was opened, just as shown in the drawings.

The operator now steps over to machine B, which by now is open and the heat and vapor from the work is not so intense because the press jaws of machine B have been open for a few seconds and the vapor has dissipated since air flows into the open space between the jaws as the press head C quickly lifts upwardly by pull of the spring F or other means. The operator now removes the finished work from machine B, lays new work thereon, closes the press B with the safety two-hand control, simultaneously opens the other machine A by pressing handle 86 on machine B, and then goes to the other press A to repeat these operations.

The invention enables one operator to rapidly use two standard make ironing presses and comprises a simple pneumatic connection between the air motors of two independent ironing presses. The machines can be used singly or in pairs and hence are manufactured in the same way for either use. The remote control attachments are simple valve parts and tube connections which are easily mounted on two presses to produce a new and useful laundry equipment.

The remote control fluid or air pressure valves 75 and 76 are normally closed by springs 77 and 78 acting to seat these remote control valves against the air pressure from the air line 89 and 90 tending to unseat them. It is seen that the motor means 1 of pressing machine A can be actuated in one direction to close press A by the operator standing at A, and that operator can move handle 85 at press A and cause the distant or remote press B to open up. Hence press B is already open when he reaches it. Time is saved and one operator gets a high rate of laundry ironing production from two ironing presses.

What I claim is:—

1. The combination of a pair of fluid operated motors, an air intake valve for controlling the flow of fluid to each of the motors, an exhaust valve for each of the motors, manual means for opening the intake valve and closing the exhaust valve, an additional exhaust valve for each motor and operating means therefor, the operating means for the additional exhaust valve of each motor being located near the manual means for closing the exhaust valve of the other motor.

2. The combination of a pair of fluid operated motors, an intake valve for controlling the flow of fluid to each of the motors, an exhaust valve for each of the motors, manual means for opening the intake valve and closing the exhaust valve, an additional exhaust valve for each motor and manual means for operating the additional exhaust valves, a portion of the manual means for controlling each motor being located in proximity to the manual means for operating the additional exhaust valve of the other motor.

3. The combination of a pair of fluid operated motors, each having an intake conduit provided with a normally closed valve therein, a normally open exhaust valve, a pipe connecting the intake conduit in multiple with the motor and the exhaust valve, a portion of said pipe serving as an exhaust pipe, manual means for closing the exhaust valve and opening the intake valve, an additional exhaust valve for each motor, manually operated means for opening the additional exhaust valve, and the manual means for the additional normally closed exhaust valve of one motor being grouped with a portion of the manual means for the normally open exhaust valve of the other motor.

4. The combination of a fluid operated motor, an intake conduit for the motor, a normally closed intake valve in said conduit, a combined inlet and exhaust pipe connected to the motor, an exhaust valve including a casing connected in said pipe, the intake conduit being connected in multiple with the motor and with said exhaust valve, an additional exhaust pipe leading from each motor, a normally closed exhaust valve having its casing connected in said additional exhaust pipe, and manual means for operating the additional exhaust valve to open it.

5. The combination of a pair of fluid operated motors, an intake conduit for each motor, a normally closed intake valve in said conduit, a combined inlet and exhaust pipe for each motor, an exhaust valve including a casing connected in said pipe, the intake conduit being connected in multiple with the motor and with the exhaust valve, an additional exhaust pipe from each motor and a normally closed exhaust valve having its casing connected in said additional exhaust pipe, means for operating the normally closed intake valve and the normally open exhaust valve for each motor to open the former valve and close the latter, manual means for opening the normally closed exhaust valve of each motor, and the last mentioned manual means being grouped with a portion of the manual means for closing the normally open exhaust valve of the other motor.

6. The combination of a pair of cylinders and pistons movable in the cylinders, each cylinder having a combined intake and exhaust port in the head thereof, a pair of exhaust valve casings for each cylinder and a normally open exhaust valve therein, an intake conduit and a normally closed intake valve in the conduit, the intake valve of each cylinder being connected to one of the exhaust valves of that cylinder to act as a unit therewith, whereby when the exhaust valve is closed, the intake valve is open, said intake conduit of each cylinder being connected in multiple with the exhaust valve casings of that cylinder and with the cylinder through the combined intake and exhaust port, manual means for operating the valves to close the exhaust valves and open the intake valves of each cylinder, each cylinder also having a supplemental exhaust port, means operated by the pressure within the cylinder through the supplemental exhaust port for holding the exhaust valves closed and the intake valve open, such means being connected in multiple with the cylinder through the supplemental exhaust port, an additional valve casing for each cylinder connected to the supplemental exhaust port and having a normally closed exhaust valve therein, manual means for opening the additional exhaust valve of each cylinder, the manual means for the additional exhaust valve of one cylinder being located near the manual means for one of the normally open exhaust valves of the other cylinder whereby both may be operated simultaneously.

7. The combination of a pair of fluid operated motors and means for controlling the operation of said motors including a normally open exhaust valve and manual means to close said exhaust valve, each motor also having a normally closed exhaust valve and operating means for opening it, the operating means for opening the normally closed exhaust valve of one motor being grouped with the operating means for the normally open exhaust valve of the other motor.

8. The combination with a cylinder and a piston movable therein, the cylinder having a combined intake and exhaust port, an intake conduit having a normally closed intake valve therein, a normally open exhaust valve, the intake conduit being connected in multiple with the exhaust valve casing and with the combined intake and exhaust port of the cylinder, manual means for closing the exhaust valve and opening the intake valve, the cylinder also having a supplemental exhaust port, a conduit leading from said port, means operated by the pressure within the cylinder through the supplemental exhaust port and the conduit leading from the supplemental exhaust port to hold said manual means in the position it has been operated by hand, a normally closed exhaust valve connected in said supplemental exhaust conduit, and manual means for opening the normally closed exhaust valve.

9. The combination of a pair of fluid operated motors, each motor including a movable member, valve means for controlling the flow of motive fluid to and from each motor comprising a normally closed intake and a normally open exhaust valve, manual means for the valves of each motor to open the intake and close the exhaust, means for holding the valve means in operated position, and release means for the valve means of each motor operable to open the exhaust valve and close the intake of that motor including a member grouped with the operating means for the other motor.

10. The combination of a pair of fluid operated motors, each including a movable member, valve means for controlling the flow of motive fluid to and from the motor comprising a normally closed intake and a normally open exhaust, valve operating means for the valves of each motor to open the intake and close the exhaust valve, spring means tending to return the valves to their normal position, means controlled by the movement of the movable member of each motor for holding the valve means of that motor in their operated position, and release means operable to return the valves to their normal position, the release means for the valves of each motor including a member grouped with the operating means for the other motor.

11. The combination of a pair of fluid operated motors, each including a movable member, means for controlling the operation of said motors comprising a normally open exhaust valve and a normally closed intake valve, operator-operated means for operating the valves, means actuated by the movement of the movable member of the motor to hold the valves in their operated position, release means for opening the valves against the holding means, and the releasing means for the valves of each motor including a member grouped with the operating means for the valves of the other motor.

12. The combination of a pair of fluid operated motors, each including a movable member, and means for controlling the operation of each motor including a normally open exhaust and a normally closed intake valve and means to return them to their normal positions, means actuated by the movable member of each motor to hold the valves in their operated position against the action of the returning means, release means for opening the exhaust valve of each motor against the holding means, and the release means for the valves of each motor including a member grouped with the operating means for the valves of the other motor.

13. The combination of a pair of spaced apart fluid operated motors, valve means for controlling the flow of motive fluid to and from each motor and normally in position to exhaust the fluid from each motor, manual means for operating the valve means of each motor, portions of said valve means being operable remotely from one of said motor means, and said remote valve portions being normally closed, additional manual means for controlling said remote portions of the valve means of each motor including a handle for the remote valve motor grouped with the first mentioned manual means for the other motor.

14. The combination of two independent ironing presses each of which has coacting press jaws, a fluid motor having a piston for actuating each press jaw, a fluid line connected to each motor, control-valve means on each press operated by a two-hand control in the line to admit fluid pressure to the motor of each press to drive the piston in one direction, and means to hold the air pressure in the motor against the piston to hold one press closed including a remote normally-closed valve means located on the other press and conduit connections between the control-valve means of the two presses, whereby the motor of the other press is permitted to reverse in direction to open that press by opening the remote normally-closed valve so that fluid pressure may flow in the conduit connection from one valve-control means of one press to the other valve-control means of the other press.

15. The combination of a pair of independently operating fluid pressure motors to actuate a pair of independently operated ironing machines, holding means on each ironing machine to hold the same closed by fluid pressure after the motor has closed it, a three-valve element control for each motor and located on each machine and including safety two-hand means to manually operate a portion of said three-valve element control to admit fluid pressure to a motor to actuate it and close that machine under the control of an attendant standing at that machine; and one of the valves of the three-valve element being a normally-closed valve and having a conduit connection therefrom to the next machine and to the holding means thereon which holds that machine closed, and the opening of said normally-closed valve acting to initiate the flow of fluid pressure thru the conduit connection to operate the holding means to cause said next machine to be opened by the operator who is remote therefrom and who is closing the other machine.

16. The combination of two independently operable ironing presses, each of which has a press head and a separate fluid pressure motor operatively connected to said head to close and hold it closed by fluid pressure which is maintained in the motor means during the ironing operation, a separate pressure feed line having a two-hand valve-control means to admit pressure to each separate motor, a conduit means having one end associated with the two-hand valve-control means on one motor for one press and a valve placed at this end of the conduit operable to open the conduit to afford a flow of pressure therethrough from one press to the other press, and means at the other end of the conduit on the other motor of the other press to exhaust the fluid pressure from the last mentioned motor when the flow of pressure takes place in the conduit whereby an operator actuating the two-hand control means at one press to close the latter can also vent the motor at the other press to open the latter.

In testimony whereof, I have hereunto signed my name, at Syracuse, in the county of Onondaga, and State of New York, this 20th day of August, 1924.

ERNEST DAVIS.